United States Patent
Wakahara et al.

[11] Patent Number: 5,376,056
[45] Date of Patent: Dec. 27, 1994

[54] SHIFT CONTROL SYSTEM IN AUTOMATIC TRANSMISSION

[75] Inventors: Tatsuo Wakahara, Kawasaki; Masahiro Yamamoto, Atsugi, both of Japan

[73] Assignee: Nissan Motor Co., Ltd., Yokohama, Japan

[21] Appl. No.: 1,714

[22] Filed: Jan. 7, 1993

[30] Foreign Application Priority Data

Jan. 7, 1992 [JP] Japan .................. 4-000778

[51] Int. Cl.⁵ ............................................. F16H 59/42
[52] U.S. Cl. ..................................................... 475/123
[58] Field of Search ................ 475/127, 125, 123, 117

[56] References Cited

U.S. PATENT DOCUMENTS

| | | | |
|---|---|---|---|
| 4,790,418 | 12/1988 | Brown et al. | 192/0.032 |
| 4,967,385 | 10/1990 | Brekkestran et al. | 364/571.03 |
| 4,981,053 | 1/1991 | Yamaguchi | 74/866 |
| 4,982,621 | 1/1991 | Sano | 74/866 |
| 5,047,936 | 9/1991 | Ishii et al. | 364/424.1 |
| 5,063,814 | 11/1991 | Baba et al. | 74/866 |
| 5,123,302 | 6/1992 | Brown et al. | 74/866 |
| 5,151,858 | 9/1992 | Milunas et al. | 364/424.1 |
| 5,179,875 | 1/1993 | Brown | 74/866 |
| 5,188,005 | 2/1993 | Sankpal et al. | 74/866 |
| 5,213,013 | 5/1993 | Fujiwara et al. | 74/866 |
| 5,231,898 | 8/1993 | Okura | 74/866 |
| 5,241,477 | 8/1993 | Narita | 364/424.1 |

OTHER PUBLICATIONS

Maintenance Manual for NISSAN RE4F02A type Automatic, 1988.

*Primary Examiner*—Dirk Wright
*Attorney, Agent, or Firm*—Foley & Lardner

[57] ABSTRACT

A shift control system in an automatic transmission controls a shifting which necessitates redeployment of friction elements so that one friction element is engaged while the other friction element is released. In reply to a shift command, the shift control system starts to control one of the engagement pressure of the friction element to be engaged or the disengagement pressure of the friction element to be disengaged. Next, the shift control system starts to control the other one of the engagement pressure or the disengagement pressure at a moment at which a preset time has elapsed from the start of the shift command. The preset time is corrected so as to decrease a physical quantity indicative of discord of the timing between the engagement and the disengagement. Accordingly, the preset time firmly takes a proper time so as to carry out the deployment of both friction elements at a synchronized point due to such a learning control. This enables the shift feeling to always be kept good.

7 Claims, 7 Drawing Sheets

| SPEEDS | FRICTION ELEMENTS | L/C | H/C | 35R/B | 2/B | LR/B |
|---|---|---|---|---|---|---|
| FORWARD | 1st | ○ | | | | △ |
| | 2nd | ○ | | | ○ | |
| | 3rd | ○ | | ○ | | |
| | 4th | ○ | ○ | | | |
| | 5th | | ○ | ○ | | |
| REVERSE | | | | ○ | | ○ |

| SPEEDS | FRICTION ELEMENTS CHAMBERS | L/C | | H/C | 35R/B | | | 2/B | LR/B | |
|---|---|---|---|---|---|---|---|---|---|---|
| | | LCA | LCR | | 5RA | 24R | 3RA | | 1A | RA |
| FORWARD | 1st | ○ | | | | | | | △ | |
| | 2nd | ○ | | | | △ | | ○ | | |
| | 3rd | ○ | | | | | ○ | | | |
| | 4th | ○ | ○ | | | △ | | | | |
| | 5th | ○ | ○ | ○ | ○ | | | | | |
| REVERSE | | | | | ○ | △ | | | | ○ |

SHIFT CONTROL SYSTEM IN AUTOMATIC TRANSMISSION

BACKGROUND OF THE INVENTION

1. Field of the Invention

The present invention relates to improvements in a shift control system in an automatic transmission for an automotive vehicle.

2. Description of the Prior Art

It is well known that an automatic transmission for an automotive vehicle is shiftable in speed ratio by selecting a predetermined speed by selective hydraulic actuation of friction elements such as a clutch and a brake to change the friction elements to be operated. Accordingly, some types of shifting necessitate redeployment of the friction elements so that one friction element or high clutch is engaged while the other friction element or band brake is released as is seen during 2→3 shift of the automatic transmission described in a Maintenance Manual for NISSAN RE4F02A type Automatic Transaxle, published by NISSAN MOTOR CO. LTD., in March, 1988. In such a shifting, a shift feeling is largely effected by the relationship of the raising of the engagement pressure and the lowering of the disengagement pressure.

However, since in the above-mentioned 2→3 shift the lowering and raising controls of the hydraulic pressure for the redeployment of the friction elements is not individually controlled, the shift feeling by the conventional shifting has a limit in its improvement. Furthermore, it is necessary to control the timing of the redeployment of both friction elements to be operated in the relation therebetween in order to obtain a preferred shift feeling. For example, when the raising of engagement pressure $P_{ON}$ is compared with the decrease of disengagement pressure as shown in FIG. 9, racing of engine speed due to accelerating downshift, or falling of the engine speed due to upshift (though not shown in FIG. 9) is caused. These changes of the engine speed generate a torque peak as shown by a torque curve $T_{OS}$ in FIG. 9, and this causes a shift shock which degrades shift feeling. On the other hand, although a one-way clutch for the shifting is often installed in such an automatic transmission and used for carrying out a smooth shifting, it is necessary that such a one-way clutch is disposed along an inner side of a transmission case. This increases a diameter of the transmission in size.

SUMMARY OF THE INVENTION

It is an object of the present invention to provide an improved shift control system in an automatic transmission which improves shift feeling without using a one-way clutch.

According to an aspect of the present invention, there is provided a shift control system in an automatic transmission for an automotive vehicle, the automatic transmission having a plurality of friction elements and processing a shifting operation in a manner to engage one of the friction elements and to disengage the other one of the friction elements, the engagement and disengagement being carried out by controlling hydraulic pressure supplied to the friction elements, respectively, the shift control system comprising:

first pressure control means controlling one of engagement pressure of the friction element to be engaged and disengagement pressure of the friction element to be disengaged in reply to a shift command which is generated for starting the shifting operation;

second pressure control means starting to control the other one of the engagement pressure and the disengagement pressure at a moment at which a preset time has elapsed from a moment that the shift command was generated;

means for detecting a physical quantity indicative of discord of the timing between the engagement and the disengagement; and means for correcting the preset time so as to decrease the physical amount.

According to another aspect of the present invention, there is provided, in a shift control system of an automatic transmission having a plurality of friction elements, wherein shifting includes engagement of one of the friction elements and disengagement of another one of the friction elements which are carried out by a method of controlling hydraulic pressure supplied to the friction elements, respectively, said method comprising the steps of:

starting to control one of engagement pressure of the friction element to be engaged and disengagement pressure of the friction element to be disengaged in reply to a shift command which is generated for starting the shifting operation;

starting to control the other one of the engagement pressure and the disengagement pressure at a moment at which a preset time has elapsed from a moment that the shift command was generated;

detecting a physical quantity indicative of discord of the timing between the engagement and the disengagement; and correcting the preset time so as to decrease the physical amount.

BRIEF DESCRIPTION OF THE DRAWINGS

In the drawings, like reference numerals designate like parts and elements throughout all figures, in which.

DETAILED DESCRIPTION OF THE INVENTION

Figures 1A, 1B, 1C:
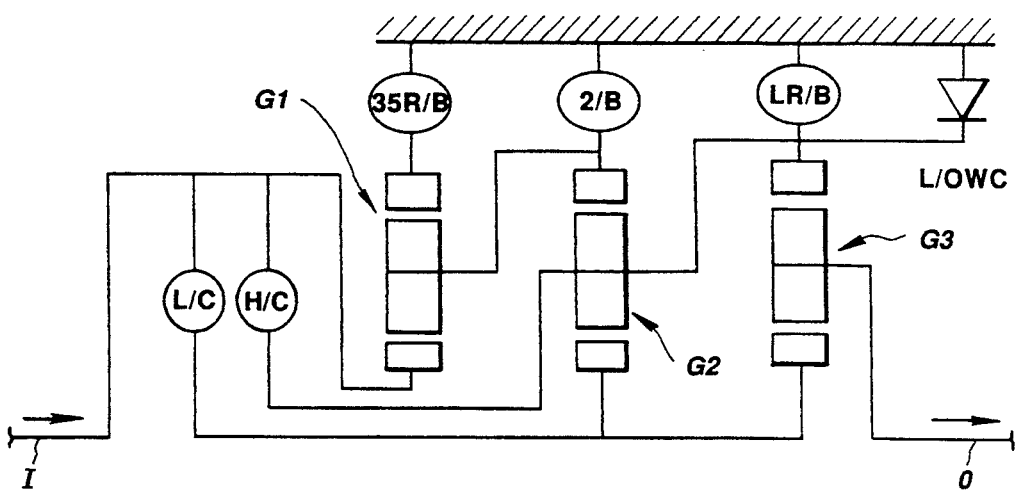
FIG. 1A is a skeleton drawing showing a gear train of an automatic transmission to which the present invention is applied.
FIG. 1B is a table showing an engagement logic of friction elements.
FIG. 1C is a table similar to FIG. 1B, further with chambers of the friction elements.

Referring first to FIG. 1A, a gear train of an automotive transmission comprises first, second and third planetary gear sets G1, G2 and G3 coaxially disposed between input and output shafts I, O. These first, second and third planetary gear sets G1, G2 and G3 are simple planetary gear sets having first, second and third sun gears, first, second and third ring gears, and first, second and third carriers, respectively. The first sun gear is connected to the input shaft I, and the second and third sun gears are connectable to the input shaft I by a low clutch L/C, and the second carrier is connectable to the input shaft I by a high clutch H/C. The first carrier and the second ring gear are integrally connected with each other and fixable by a second brake 2/B. The first ring gear is fixable by a third speed/fifth speed/reverse band brake 35R/B. Additionally, the second carrier and the third ring gear are integrally connected with each other and fixable by a low reverse brake LR/B. The second carrier and the third ring gear are prevented by a low one-way clutch L/OWC from rotating in the direction opposite to the rotating direction of the input shaft I.

Referring to FIG. 1B, the gear train can select forward first speed to fifth speed and reverse by a combination of the friction element(s) engagement (cell with a circle) and the friction element(s) disengagement (cell with a void). Referring to FIG. 1C, a cell with a circle indicates a chamber of each friction element to be supplied with hydraulic fluid for obtaining engagement and disengagement thereof. It is to be noted that, in engagement logic tables in FIGS. 1B and 1C, a cell with a triangle indicates a friction element of a chamber which is unconcerned with a selection of the speed, but to be engaged or supplied with hydraulic fluid for the purpose which will be described hereinafter.

Figure 2:
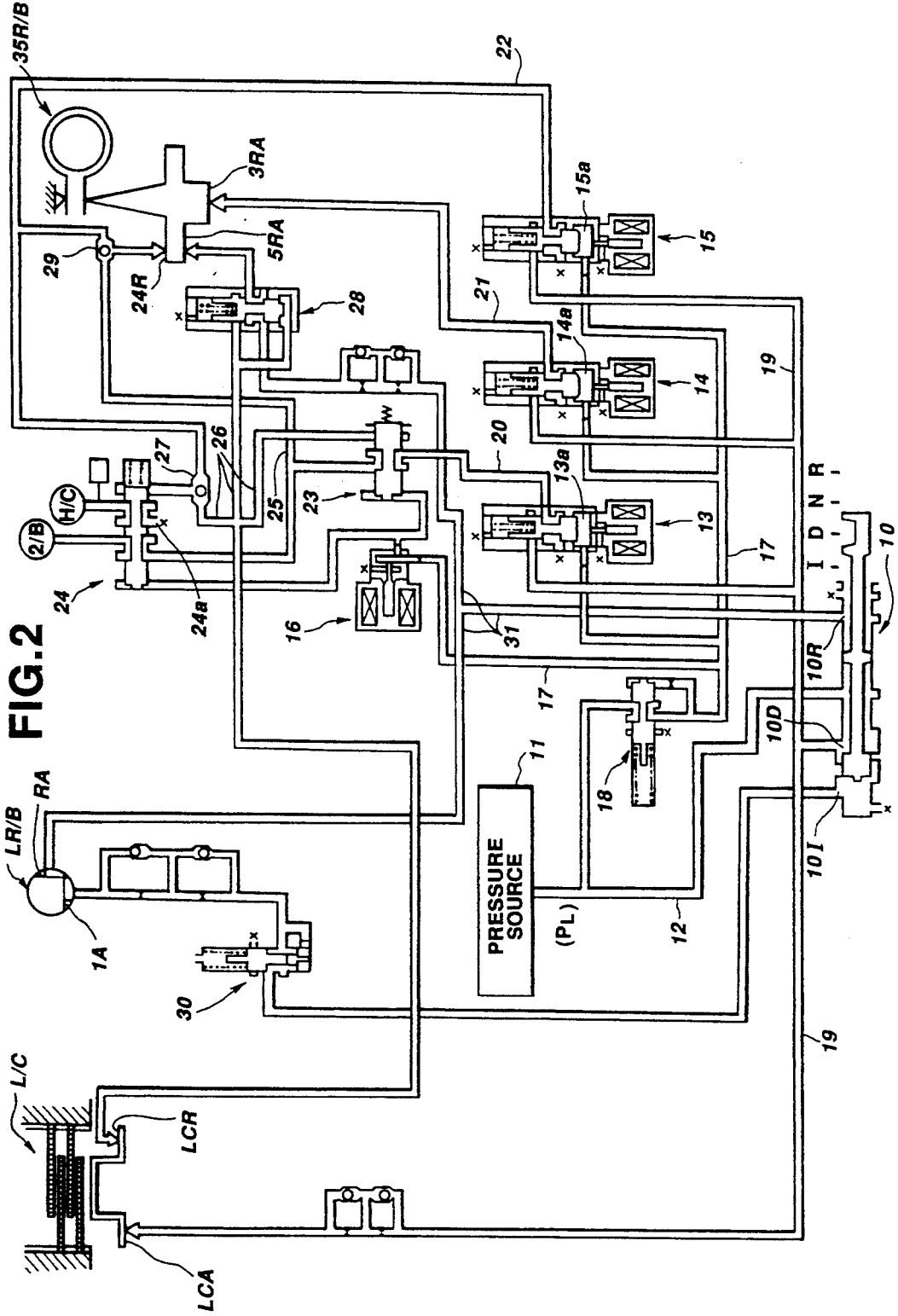
FIG. 2 is a circuit diagram showing a shift control hydraulic circuit of the gear train.

Referring to FIG. 2, there is shown a shift control hydraulic circuit for the gear train in FIG. 1A, by which an engagement logic in FIGS. 1B and 1C is achieved. 10 designates a manual valve having forward automatic change speed range (D range) as illustrated in FIG. 2, first speed engine brake range (I range), stop range (N range), and reverse range (R range) which are manually established by a driver in accordance with a desired cruising pattern. It is to be noted that the manual valve 10 also has parking range (P range) and second engine brake range (II range), which are omitted here as failing to have a connection with the present invention.

The manual valve 10 is arranged such that line pressure PL built up in a pressure source 11 and outputted to a circuit 12 is outputted to one of the ports in accordance with a selected range, such as to a port 10D in D range, a port 10I in I range, and a port 10R in R range. In N range, the line pressure circuit 12 does not communicate with any of the ports, and all the ports are drained off.

13, 14, 15 designate first, second and third duty solenoid valves, respectively, and 16 designates a solenoid selector valve. These valves 13–16 are supplied with constant pilot pressure via a circuit 17. This pilot pressure is produced by reducing line pressure PL to a predetermined value in a pilot valve 18.

Additionally, the duty solenoid valves 13, 14, 15 are connected to a forward pressure circuit 19 which in turn communicates with an apply chamber LCA of the low clutch L/C.

At 0% in duty, the duty solenoid valves 13, 14, 15 preserve positions as illustrated in FIG. 2 wherein pilot pressure within chambers 13a, 14a, 15a is all drained off to achieve drainage of circuits 20, 21, 22. As the duty is increased to 100%, pressure within the chambers 13a, 14a, 15a is built up to the same value as pilot pressure so as to achieve build up of pressure within the circuits 20, 21, 22 up to the same value as line pressure within the forward pressure circuit 19.

In the ON state, the solenoid selector valve 16 supplies pilot pressure within the circuit 17 to selector valves 23, 24 so as to cause rightward displacement as viewed in FIG. 2, whereas in the OFF state, the solenoid selector valve 16 puts the selector valves 23, 24 in positions as illustrated in FIG. 2. The selector valve 23 allows communication of the circuit 20 with a circuit 25 in the position as illustrated in FIG. 2, whereas the selector valve 23 allows communication of the circuit 20 with a circuit 26 upon rightward displacement. The selector valve 24 allows communication of the second brake 2/B with the circuit 25, and the high clutch H/C with a drain port 24a in the position as illustrated in FIG. 2, whereas the selector valve 24 allows communication of the second brake 2/B with the drain port 24a, and the high clutch H/C with an output port of a shuttle valve 27 upon rightward displacement.

The shuttle valve 27 has one input port connected to the circuit 26 which also communicates with a fifth speed and reverse apply chamber 5RA of the band brake 35R/B via a release chamber LCR of the low clutch L/C and a selector valve 28. The shuttle valve has the circuits 22, 24 communicate with a second and fourth speeds release chamber 24R of the band brake 35R/B via a shuttle valve 29, and the circuit 21 is connected to a third speed and reverse apply chamber 3RA of the band brake 35R/B.

The port 10I of the manual valve 10 is connected to a first speed apply chamber 1A of the low reverse brake LR/B via an I range pressure reducing valve 30. The port 10R of the manual valve 10 is connected to a reverse apply chamber RA of the low reverse brake LR/B via a circuit 31, and to a fifth speed and reverse apply chamber 5RA of the band brake 35R/B via the selector valve 28.

Figure 3:
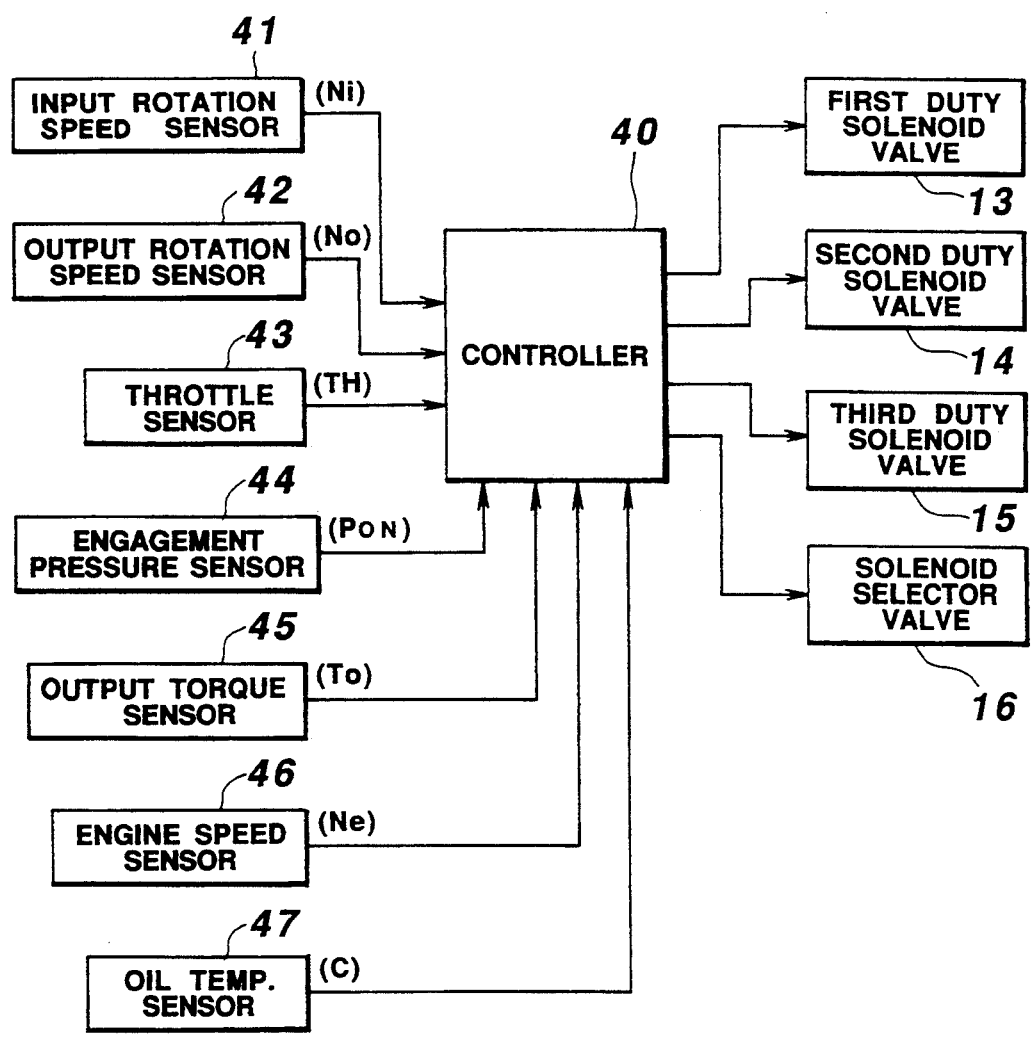
FIG. 3 is a block diagram of an electrical control system for controlling valves in the shift control hydraulic circuit.

As shown in FIG. 3, the first, second and third duty solenoid valves 13, 14 and 15 and the solenoid selector valve 16 are connected to a controller 40 for the control thereof. The controller 40 is also connected to an input rotation speed sensor 41 which detects an input rotation speed Ni and outputs a signal indicative of the input rotation speed Ni, an output rotation sensor 42 which detects a transmission output rotating speed $N_O$ and outputs a signal indicative of the transmission output rotating speed $N_O$, a throttle sensor 43 which detects an engine throttle opening TH and outputs a signal indicative of the engine throttle opening TH, an engagement pressure sensor 44 which detects an engagement pressure $P_{ON}$ of the second brake 2/B and outputs a signal indicative of the engagement pressure $P_{ON}$, an output torque sensor 45 which detects a transmission output torque To and outputs a signal indicative of the transmission output torque To, an engine speed sensor 46 which detects an engine speed Ne and outputs a signal indicative of the engine speed Ne, and an oil temperature sensor 47 which detects an operating oil temperature C of the automatic transmission and outputs a signal indicative of the operating oil temperature C.

Next, the operation of this embodiment will be described. In N range of the manual valve 10, line pressure within the circuit 12 is not outputted to any of the ports 10D, 10I, 10R, and all the ports are drained off. As a result, all the friction elements are out of operation or released, so that the automatic transmission fails to perform power transmission between the input and output shafts I, O, while keeping a vehicle at a stand still.

In first speed: When the manual valve 10 is put in D range in accordance with a driver's request for forward cruising, line pressure $P_L$ within the circuit 12 is output to the port 10D. This line pressure $P_L$ out of the port 10D comes to the apply chamber LCA of the low clutch L/C via the circuit 19 and engages this clutch L/C. On the other hand, when the cruising condition forces a selection of first speed, the controller 40 puts the duty solenoid valves 13, 14, 15 at 0% in duty, and turns off the solenoid selector valve 16. Thus, since the circuits 20, 21, 22 are out of pressure, and the selector valves 23, 24 are positioned as illustrated in FIG. 2, the release chamber LCR of the low clutch L/C, the second brake 2/B, the high clutch H/C, and all the chambers 3RA, 5RA, 24R of the band brake 35R/B are drained off. Accordingly, the automatic transmission has only the low clutch L/C engaged, and first speed is selected.

In first speed, the gear train as shown in FIG. 1 cannot obtain engine brake due to existence of the low one-way clutch L/OWC. If engine brake is needed in first speed, the driver puts the manual valve 10 in I range to output line pressure from not only the port 10D, but the port 10I. At that time, line pressure out of the port 10I comes to a chamber 1A of the low reverse brake LR/B via the reducing valve 30 (see FIG. 1C, a corresponding cell with a triangle), producing additional actuation of this brake LR/B, thus enabling engine brake in first speed.

In second speed: When, in D range, first speed, the cruising condition forces a selection of second speed, the controller 40 gradually increases the duty of the first duty solenoid valve 13 to produce and gradually increase pressure within the circuit 20. This pressure comes to the second brake 2/B via the selector valves 23, 24 to gradually engage the former, enabling upshift change speed frown first to second speed without a shock.

Engagement pressure of the second brake 2/B comes to the release chamber 24R of the band brake 35R/B via the shuttle valve 29 (see FIG. 1C, a corresponding cell with a triangle) and prohibits engagement of the band brake 35R/B in cooperation with a return spring. As a result, even if the duty solenoid valve 13 produces pressure in the circuit 21 due to failure of a control system, the band brake 35R/B cannot be engaged and can avoid impossible cruising due to interlock of the automatic transmission.

In third speed: When, in second speed, the cruising condition forces a selection of third speed, the controller 40 gradually decreases the duty of the first duty solenoid valve 13 to reduce pressure within the circuit 20 or second brake 2/B, whereas it gradually increases the duty of the second duty solenoid valve 14 to produce and gradually increase pressure within the circuit 21 or chamber 3RA of the band brake 35R/B. This causes redeployment of the friction elements that the second brake 2/B is released while the band brake 35R/B is engaged, and enables upshift change speed from second to third speed.

Since, during this shifting, engagement pressure of the second brake 2/B to be released and engagement pressure of the band brake 35R/B to be engaged are controlled individually by the duty solenoid valves 13 and 14, release timing of the second brake 2/B and engagement timing of the band brake 35R/B can be adjusted properly and freely in accordance with the cruising condition and specification of the vehicle, as will be discussed hereinafter with reference to FIG. 4 specification of the vehicle.

In fourth speed: When, in third speed, the cruising condition forces a selection of fourth speed, the controller 40 turns on the solenoid selector vales 16 to switch the selector valves 23, 24 in the rightward position as view in FIG. 2 by pilot pressure of the circuit 17. At the same time, it gradually decreases the duty of the second duty solenoid valve 14 to reduce pressure within the circuit 21 (pressure within the apply chamber 3RA of the band brake 35R/B), and gradually increases the duty of the third duty solenoid valve 15 to obtain a gradual increase in pressure within the circuit 22 (engagement pressure coming to the high clutch H/C via the shuttle valve 27 and the selector valve 24). This causes redeployment of the friction elements so that the band brake 35R/B is released while the high clutch H/C is engaged, and enables upshift change speed from third to fourth speed.

Since, during this shifting also, engagement pressure within the chamber 35A of the band brake 35R/B to be released and engagement pressure of the high clutch H/C to be engaged are controlled individually by the duty solenoid valves 14 and 15, the same effect as that one during 2→3 shift can be expected.

Engagement pressure of the high clutch H/C within the circuit 22 comes to the release chamber 24R of the band brake 35R/B via the shuttle valve 29 (see FIG. 1C, a corresponding cell with a triangle), and prohibits engagement of the band brake 35R/B in cooperation with the return spring. As a result, even if the duty solenoid valve 14 produces pressure in the circuit 21 due to failure of the control system, the band brake 35R/B cannot be engaged, and interlock of the automatic transmission is avoided.

In fifth speed: When, in fourth speed, the cruising condition forces a selection of fifth speed, the controller 40 decreases the duty of the third duty solenoid valve 15 to reduce pressure within the circuit 22, and increases the duty of the first duty solenoid valve 13 to obtain an increase in pressure within the circuit 20. A decrease in pressure within the circuit 22 allows the high clutch H/C to release while pressure within the circuit 20 comes to the high clutch H/C via the selector valve 23, the shuttle valve 27, the circuit 26, and the selector valve 24, keeping the high clutch H/C engaged. Pressure directed to the circuit 26 also comes to the release chamber LCR of the low clutch L/C, releasing same due to a larger pressure acting area of the chamber LCR than the chamber LCA. Additionally, pressure within the circuit 20 comes to the apply chamber 5RA of the band brake 35R/B via the selector valve 28, and the release chamber 24R of the band brake 35R/B is drained off due to a decrease in pressure within the circuit 22, achieving engagement of the band brake 35R/B. This allows the automatic transmission to cause upshift change speed from fourth to fifth speed.

Likewise, 5→4, 4→3, 3→2, and 2→1 downshift change of speed are achieved by the corresponding control of the duty solenoid valves 13, 14, 15 and the solenoid selector valve 16 in a predetermined manner. In such downshift change of speeds wherein a decrease and increase in engagement pressure of the friction elements to be redeployed by the duty solenoid valves 13, 14, 15 is controllable individually, the same effect as that one during 2→3 shift is produced.

Reverse: When the manual valve 10 is put in R range in accordance with a driver's request for reverse, line pressure PL within the circuit 12 is outputted to the circuit 31 from the port 10R, and the other ports are all drained off. Basically, the controller 40 puts the duty solenoid valves 13, 14, 15 at 0% in duty to obtain non-pressure state of the circuit 20, 21, 22, and turns off the solenoid selector valve 16 to position the selector valves 23, 24 as illustrated in FIG. 2.

Pressure within the circuit 31 comes to the apply chamber RA of the low reverse brake LR/B to engage same on the one hand, and comes to the apply chamber 5RA of the band brake 35R/B via the selector valve 28 to engage same on the other hand. This allows the automatic transmission to select reverse.

A greater brake capacity of the band brake 35R/B is desirable upon, e.g., a quick depression of the accelerator pedal. In that case, the controller 40 increases the duty of the second duty solenoid valve 14 to produce pressure within the circuit 21 (see FIG. 1C, corresponding cells with a triangle). This pressure comes to the chamber 3RA to enlarge the engaging force of the band brake 35R/B, and improves the brake capacity thereof as requested.

The manner of operation of the shift control system according to the present invention will be discussed hereinafter with reference to a flow chart of FIG. 4 and a time chart of FIG. 7.

Figure 4:
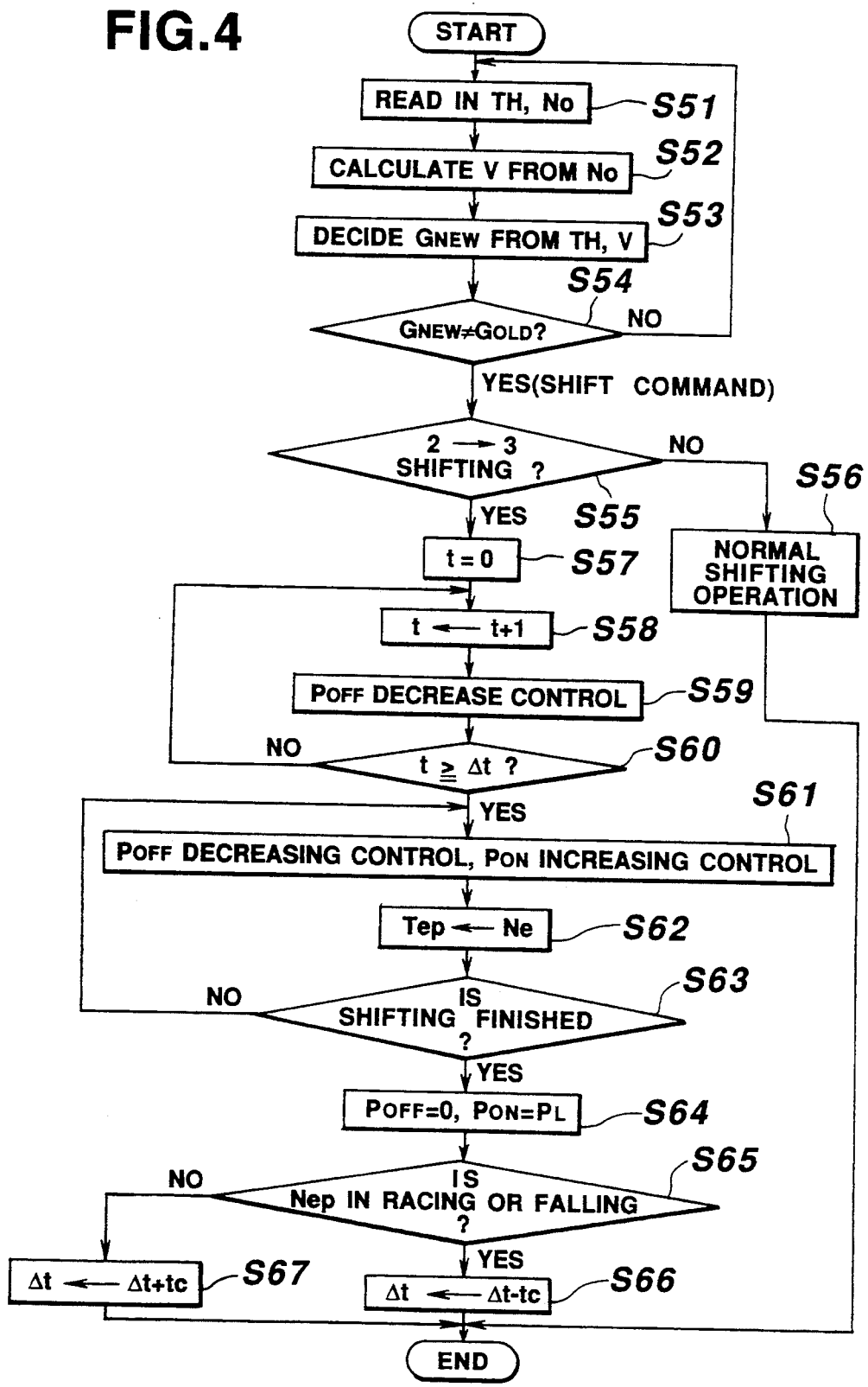
FIG. 4 is a flow chart showing a control program carried out by a controller shown in FIG. 3.

FIG. 4 shows a main routine carried out at predetermined time intervals. The time chart of FIG. 7 shows changes of the transmission output torque $T_O$, the engine speed Ne and engagement and disengagement pressures $P_{ON}$, $P_{OFF}$ during upshift operation which is carried out according to the shift control of the present invention so as to provide a preferred shift feeling without a shift shock.

As shown in FIG. 4, in a step S51, the throttle opening TH and the output rotating speed $N_O$ are read in the controller 40. In a step S52, a vehicle speed V is calculated from the output rotating speed $N_O$. In a step S53, a shift position Gnew, which is optimum for the running condition of the automotive vehicle, is decided from a map in the controller 40 on the basis of the throttle opening TH and the vehicle speed V.

In a step S54, it is judged whether or not the decided optimum shift position is the same as that in use. When the judgment in the step S54 is "NO", the program returns to the step S51. When the judgment in the step S54 is "YES", the program proceeds to a step S55 wherein it is checked whether the 2→3 shifting is carried out or not. When the judgment in the step S55 is "NO", the program proceeds to a step S56 wherein a normal shifting operation is carried out. When the judgment in the step S55 is "YES", the program proceeds to a step S57 wherein a timer t is cleared (corresponding to a moment $t_0$ in FIG. 7). Following this, in a step S58 the timer t is incremented by 1 (t←t+1).

In a step S59, the disengagement pressure $P_{OFF}$ of the brake 35R/B is drained off by decreasing the duty of the valve 13, and the engagement pressure $P_{ON}$ to the 3RA chamber of the brake 35R/B is raised by increasing the duty of the valve 14. Following this, in a step S60 it is checked whether or not an elapsed time t from a starting moment of a shift command is greater than or equal to a preset time $\Delta t$. When the judgment in the step S60 is "NO" (t<$\Delta t$), the program returns to the step S58, and the steps S58, S59 and S60 are repeated until the judgment in the step S60 becomes "YES" (t≧$\Delta t$). When the judgment in the step S60 is "YES", the program proceeds to a step S61 wherein the disengagement pressure of the brake 35R/B is further drained off by decreasing the duty of the valve 13, and the engagement pressure $P_{ON}$ to the 3RA chamber of the brake 35R/B is further raised by increasing the duty of the valve 14.

In a step S62, a peak value Nep of the engine speed Ne is renewed. Following this, in a step S63 it is judged whether or not an input/output rotating speed ratio Ni/No representative of a real gear ratio is the same as a gear ratio after the shifting, that is, whether the shifting is finished or not. The steps S62 and S63 are repeated until the judgment in the step S63 becomes "YES"

Just after the shifting, in a step S64, the disengagement pressure $P_{OFF}$ is set to 0 and the engagement pressure $P_{ON}$ is set to the same value as a line pressure $P_L$.

In a step S65, it is judged whether or not the peak value Nep of the engine speed is in racing or falling relative to the engine speed Nee after shifting. When the judgment in the step S65 is "YES", the program proceeds to a step S66 wherein the preset time $\Delta t$ is subtracted by tc ($\Delta t \leftarrow \Delta t - tc$). That is to say, since it is judged in the step S65 that the preset time $\Delta t$ is too long and the raising of the engagement pressure $P_{ON}$ is too late relative to the lowering of the disengagement pressure $P_{OFF}$, the preset time $\Delta t$ is shortened. When the judgment in the step S65 is "NO", the program proceeds to a step S67 wherein the preset time $\Delta t$ is incremented by tc ($\Delta t \leftarrow \Delta t + tc$). With such a learning control of the preset time $\Delta t$ after shifting, the preset time firmly takes a proper time so as to carry out the deployment of both brakes at a synchronized point. This enables shift feeling to always be kept good.

Figure 7:
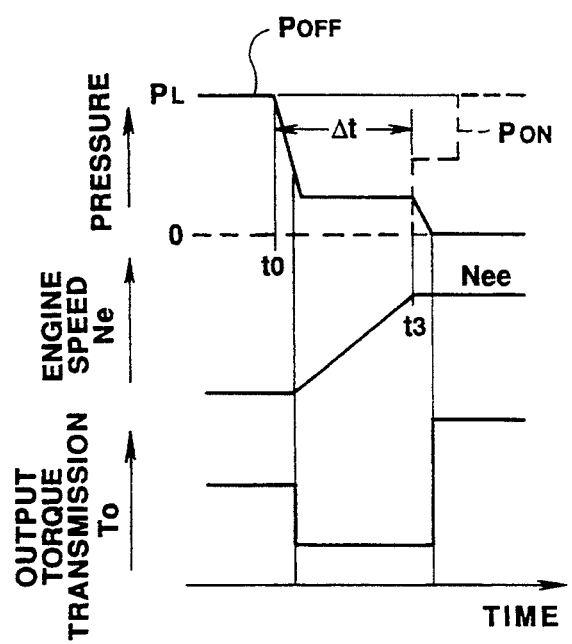
FIG. 7 is a time chart showing shifting operation for downshift to which the shift control system according to the present invention is applied.
Figure 8:
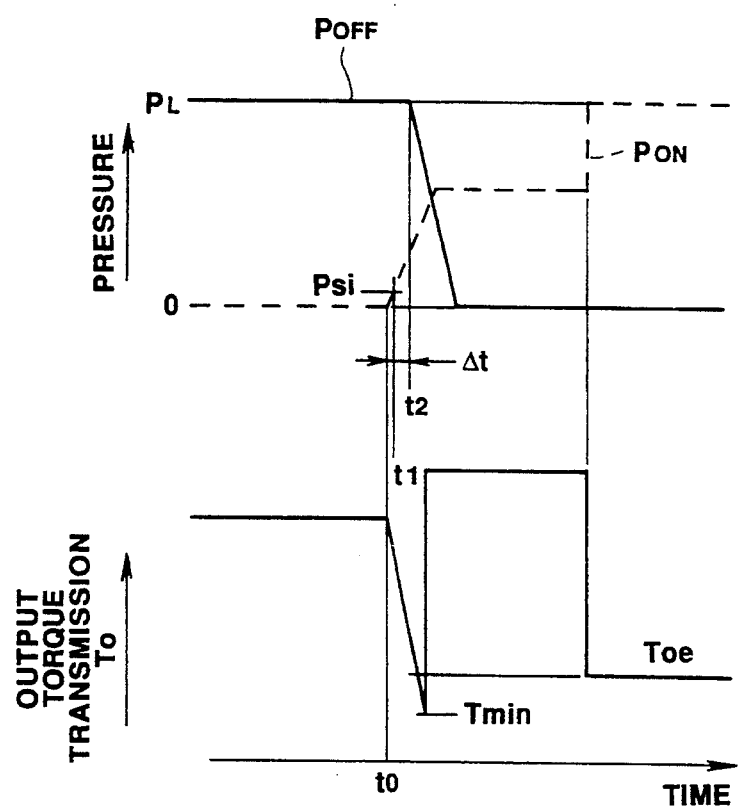
FIG. 8 is a time chart showing shift operation for upshift to which the shift control system according to the present invention is applied.
Figure 9:
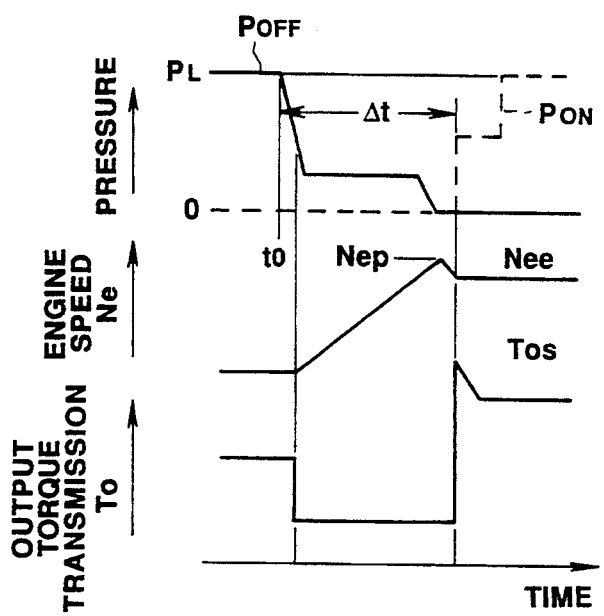
FIG. 9 is a time chart showing shift operation for upshift in a conventional manner.

Although the preferred embodiment has been shown and described such that lowering of the disengagement pressure is started in reply to the shift command and raising of the engagement pressure is started after a preset time $\Delta t$ as shown in FIG. 7, it is to be noted that such shift feeling is also obtained in a manner that the engagement pressure $P_{ON}$ is raised at the shift command moment $t_0$, the disengagement pressure $P_{OFF}$ is lowered from a moment $t_2$ which is a preset time $\Delta t$ past from the moment $t_0$ and the preset time $\Delta t$ is controlled by a learning control as shown in FIG. 8.

Figure 5:
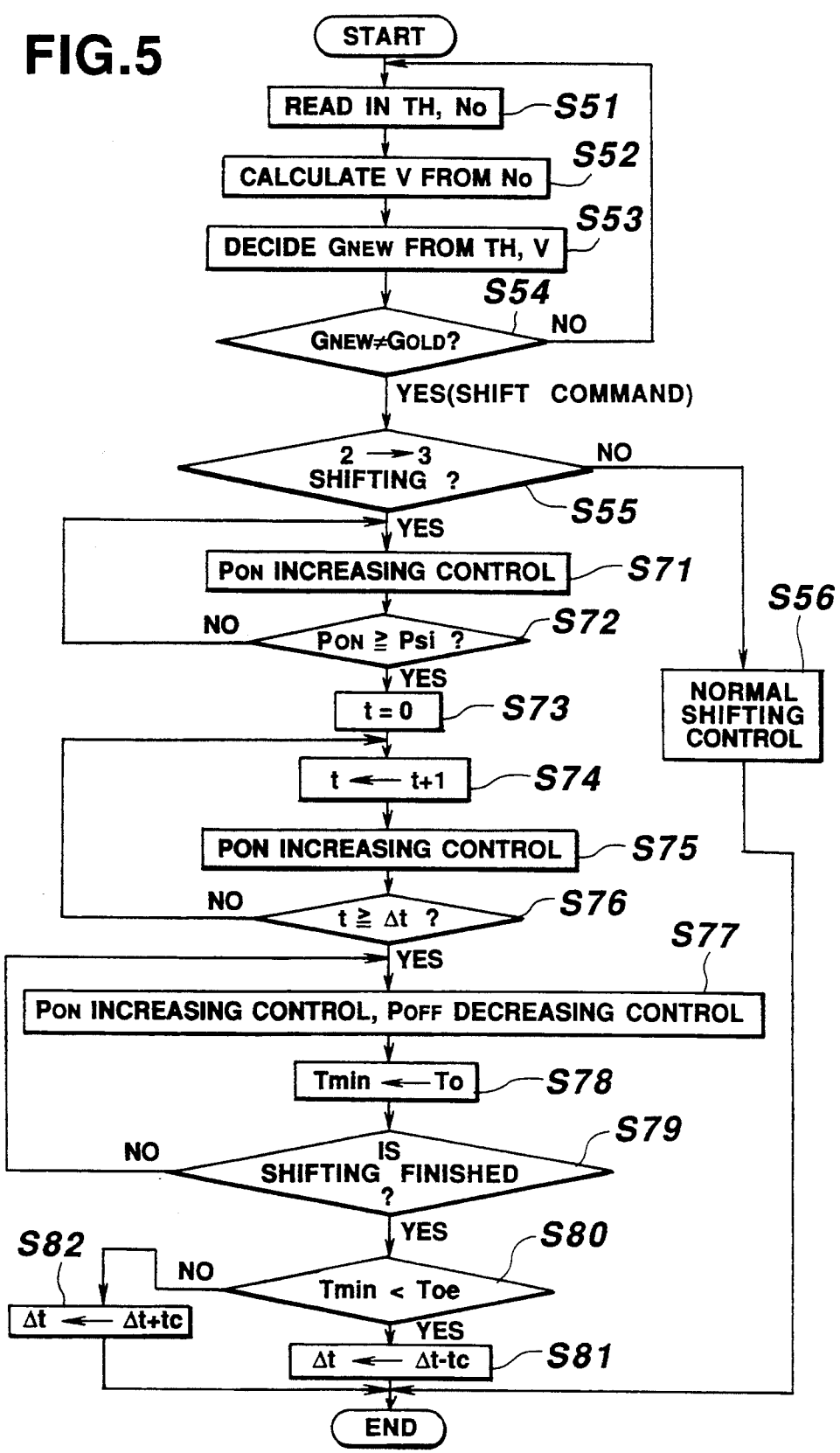
FIG. 5 is a flow chart showing another control program applied to another embodiment of the shift control system according to the present invention.

The manner of operation of the aforementioned shift control by learning control according to the present invention will be discussed hereinafter with reference to FIGS. 5 and 8. FIG. 5 shows a main routine carried out at predetermined time intervals. The time chart of FIG. 8 shows changes of the transmission output torque $T_O$ and engagement and disengagement pressures $P_{ON}$, $P_{OFF}$ during downshift operation which is carried out according to the shift control of the present invention so as to provide a preferred shift feeling without a shift shock. In this embodiment, steps 51 to 55 in FIG. 5 are similar to those of the first embodiment.

When in the step S55 it is judged that 2→3 shifting is carried out, the program proceeds to a step S71 wherein the engagement pressure $P_{ON}$ of the brake 35R/B is increased. Following this, in a step S72, it is judged whether the engagement pressure $P_{ON}$ becomes greater than a preset micro-value $P_{S1}$ or not. When the judgment in the step S72 is "NO", the program returns to the step S71 and the steps S71 and S72 are repeated until the judgment in the step S72 changes "YES". When the judgment in the step S72 is YES", the program proceeds to a step S73 wherein a timer t is cleared (t←0). Following this, in a step S74 the timer t is incremented by 1 (t<t+1). In a step S75 the engagement pressure $P_{ON}$ is further increased. In a step S76 it is judged whether the timer t becomes greater than or equal to a preset time $\Delta t$ or not. When the judgment in the step S76 is "NO", the program returns to the step S74, and the steps S74, S75 and S76 are repeated until the judgment in the step S76 becomes "YES".

When the judgment in the step S76 is "YES", the program proceeds to a step S77 wherein the engagement pressure $P_{ON}$ is further increased while the disengagement pressure $P_{OFF}$ is decreased as shown in FIG. 8. In a step S78 the minimum value Tmin of the transmission output torque To is renewed. In a step S79 it is judged whether the shifting is finished or not. When the judgment in the step S79 is "NO", the program returns to the step S77 and the steps S77, S78 and S79 are repeated until the judgment in the step S79 changes to "YES". When the judgment in the step S79 is "YES", the program proceeds to a step S80 wherein it is judged whether or not the minimum value Tmin of the transmission output torque To is smaller than the output torque Toe after shifting shown in FIG. 8. That is to say, it is checked whether the failing of the torque has been caused or not.

When the judgment in the step S80 is "YES", it is judged that the start timing of the drainage of the disengagement pressure $P_{OFF}$ was too early. Accordingly, the program proceeds to a step S81 wherein the preset time $\Delta t$ is shortened by a predetermined value tc. When the judgment in the step S80 is "NO", that is, when it is judged that the falling of the transmission output torque has not been caused, the program proceeds to a step S82 wherein the preset time $\Delta t$ is increased by the predetermined value tc. With such a learning control of the preset time $\Delta t$ after shifting, the preset time firmly takes a proper time period to carry out the deployment of both brakes at a synchronized point. This enables shift feeling to always be kept good.

Figure 6:
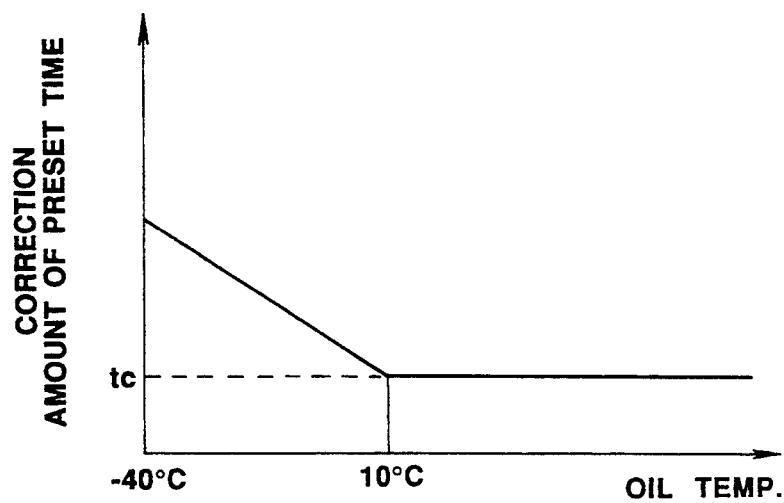
FIG. 6 is a graph showing a changing characteristic of a preset time correction amount relative to an oil temperature, which is applied to both embodiments the shift control system.

Under an extremely low temperature, since the oil temperature of the automatic transmission is kept low, it is difficult to obtain the correction effect by the above-mentioned learning control. Accordingly, the shift control system is arranged such that the correction amount tc is changed to be greater than a normal correction amount under such a low oil temperature condition as shown in FIG. 6.

What is claimed is:

1. A shift control system in an automatic transmission associated with an engine of an automotive vehicle, the automatic transmission having a plurality of friction elements and processing a shifting operation in a manner to engage one of the friction elements and to disengage the other one of the friction elements, the engagement and disengagement being carried out by controlling hydraulic pressure supplied to the friction elements, respectively, the shift control system comprising:

first pressure control means for starting to control one of engagement pressure of the friction element to be engaged or disengagement pressure of the friction element to be disengaged in reply to a shift command which is generated for starting the shifting operation;

second pressure control means independent from said first pressure control means and for starting to control the other one of the engagement pressure or the disengagement pressure at a moment at which a preset time has elapsed from a moment that the shift command was generated;

means for detecting a physical quantity indicative of discord of the timing between the engagement and the disengagement, from an engine speed of the engine; and means for correcting the preset time so as to decrease the physical quantity.

2. A shift control system as claimed in claim 1, wherein the physical quantity includes at least one of a racing amount and a failing amount of the engine speed of the engine associated with the automatic transmission.

3. A shift control system as claimed in claim 1, wherein the physical quantity includes a falling amount of an output torque of the automatic transmission.

4. A shift control system as claimed in claim 1, wherein the preset time correcting means corrects the preset time by a correcting time which is changed according to an oil temperature of the automatic transmission.

5. A shift control system as claimed in claim 3, wherein the preset time correcting means corrects the preset time by a correcting time which is changed according to an oil temperature of the automatic transmission.

6. In a shift control system of an automatic transmission associated with an engine of an automotive vehicle and having a plurality of friction elements, wherein shifting includes engagement of one of the friction elements and disengagement of another one of the friction elements which are carried out by a method of controlling hydraulic pressure supplied to the friction elements, respectively, said method comprising the steps of:

starting to control one of engagement pressure of the friction element to be engaged or disengagement pressure of the friction element to be disengaged in reply to a shift command which is generated for starting the shifting operation;

starting to control the other one of the engagement pressure or the disengagement pressure at a moment at which a preset time has elapsed from a moment that the shift command was generated;

detecting a physical quantity indicative of discord of the timing between the engagement and the disengagement, from an engine speed of the engine; and correcting the preset time so as to decrease the physical quantity.

7. A shift control system for an automotive vehicle automatic transmission, the system comprising:

first pressure control means for starting to control one of engagement pressure of a friction element to be engaged or disengagement pressure of a friction element to be disengaged in reply to a shift command which is generated for starting a shifting operation;

second pressure control means independent from said first pressure control means and for starting to control the other one of the engagement pressure or the disengagement pressure at a moment at which a preset time has elapsed from a moment that the shift command was generated;

means for detecting an engine speed of an engine associated with the automatic transmission during a shifting and generating an engine speed indicative signal indicative of the engine speed detected; and a control unit including:

means for repeatedly reading the engine speed indicative signals;

means for deriving a peak value from the engine speed indicative signals during the shifting and generating a peak value indicative signal of the peak value derived;

means for comparing the peak value with an engine speed indicative signal detected at a time after the shifting and deciding whether or not the peak value indicates a racing or falling; and means for correcting the preset time when said comparing means judges the peak value indicates a racing or falling.

* * * * *